United States Patent
Dressel et al.

(10) Patent No.: US 10,438,720 B2
(45) Date of Patent: Oct. 8, 2019

(54) CONNECTOR FOR CONNECTING CELLULAR ELECTRICAL ELEMENTS

(71) Applicant: TE Connectivity Germany GmbH, Bensheim (DE)

(72) Inventors: Andre Martin Dressel, Lampertsheim (DE); Wilhelm Grzywok, Munich (DE); Uwe Hauck, Kleinmachnow (DE); Bart Van Sebroeck, Bensheim (DE); Peter Bormuth, Heppenheim-Sonderbach (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 15/139,830

(22) Filed: Apr. 27, 2016

(65) Prior Publication Data

US 2016/0240280 A1    Aug. 18, 2016

Related U.S. Application Data

(63) Continuation of application No. PCT/EP2014/072696, filed on Oct. 23, 2014.

(30) Foreign Application Priority Data

Oct. 28, 2013    (DE) .................. 10 2013 221 872

(51) Int. Cl.
*H01B 7/08* (2006.01)
*H01R 11/28* (2006.01)
(Continued)

(52) U.S. Cl.
CPC ............... *H01B 7/08* (2013.01); *H01G 11/10* (2013.01); *H01G 11/72* (2013.01); *H01G 11/76* (2013.01);
(Continued)

(58) Field of Classification Search
None
See application file for complete search history.

(56) References Cited

U.S. PATENT DOCUMENTS 4,629,279 A * 12/1986 Nishikawa ........... H01R 13/514
439/404
8,936,865 B2    1/2015 Kim
(Continued)

FOREIGN PATENT DOCUMENTS

CN    102044693 A    5/2011
EP    0986114 A1    3/2000
(Continued)

OTHER PUBLICATIONS

Kinoshita et al. (WO 2013/061871, a raw machine translation of JP, 2013-097896 is being used as the English translation) (Abstract, Detailed Description and Drawings).*
(Continued)

*Primary Examiner* — Carmen V Lyles-Irving
(74) *Attorney, Agent, or Firm* — Barley Snyder

(57) ABSTRACT

A connector for connecting cellular electrical elements is disclosed. The connector has a ribbon-shaped support element, a ribbon-shaped retaining element, and a contact element arranged between the support element and the retaining element.

19 Claims, 4 Drawing Sheets

(51) Int. Cl.
*H01G 11/72* (2013.01)
*H01M 2/20* (2006.01)
*H01G 11/10* (2013.01)
*H01M 2/22* (2006.01)
*H01R 4/02* (2006.01)
*H01R 11/01* (2006.01)
*H01G 11/76* (2013.01)

(52) U.S. Cl.
CPC .............. *H01M 2/206* (2013.01); *H01M 2/22* (2013.01); *H01R 4/029* (2013.01); *H01R 11/01* (2013.01); *H01R 11/288* (2013.01); *H01M 2220/20* (2013.01); *Y02E 60/13* (2013.01); *Y02T 10/7022* (2013.01)

(56) References Cited

U.S. PATENT DOCUMENTS

| | | | |
|---|---|---|---|
| 2005/0110458 A1* | 5/2005 | Seman, Jr. | H01M 2/204 320/114 |
| 2011/0287299 A1* | 11/2011 | Kim | H01M 2/1077 429/158 |
| 2013/0309553 A1 | 11/2013 | Yuko Kinoshita et al. | |
| 2015/0357620 A1* | 12/2015 | Nakayama | H01M 2/206 429/90 |

FOREIGN PATENT DOCUMENTS

| | | |
|---|---|---|
| JP | 2013016381 A | 1/2013 |
| JP | 2013-37777 A | 2/2013 |
| WO | 2013061871 A1 | 5/2013 |

OTHER PUBLICATIONS

International Search Report, Application No. PCT/EP2014/072696, dated Jan. 21, 2015, 3 pages.
Abstract of WO2013061871, dated May 2, 2013, 2 pages.
Abstract of JP2013016381, dated Jan. 24, 2013, 1 page.
Chinese Second Office Action, English translation, dated Dec. 25, 2017, 4 pages.
Chinese Third Office Action, English translation, dated Jul. 13, 2018, 7 pages.
Japanese Notice of Reasons for Refusal with English translation, dated Oct. 2, 2018, 6 pages.
Abstract of JP 2013-037777A, dated Feb. 21, 2013, 1 page.

* cited by examiner

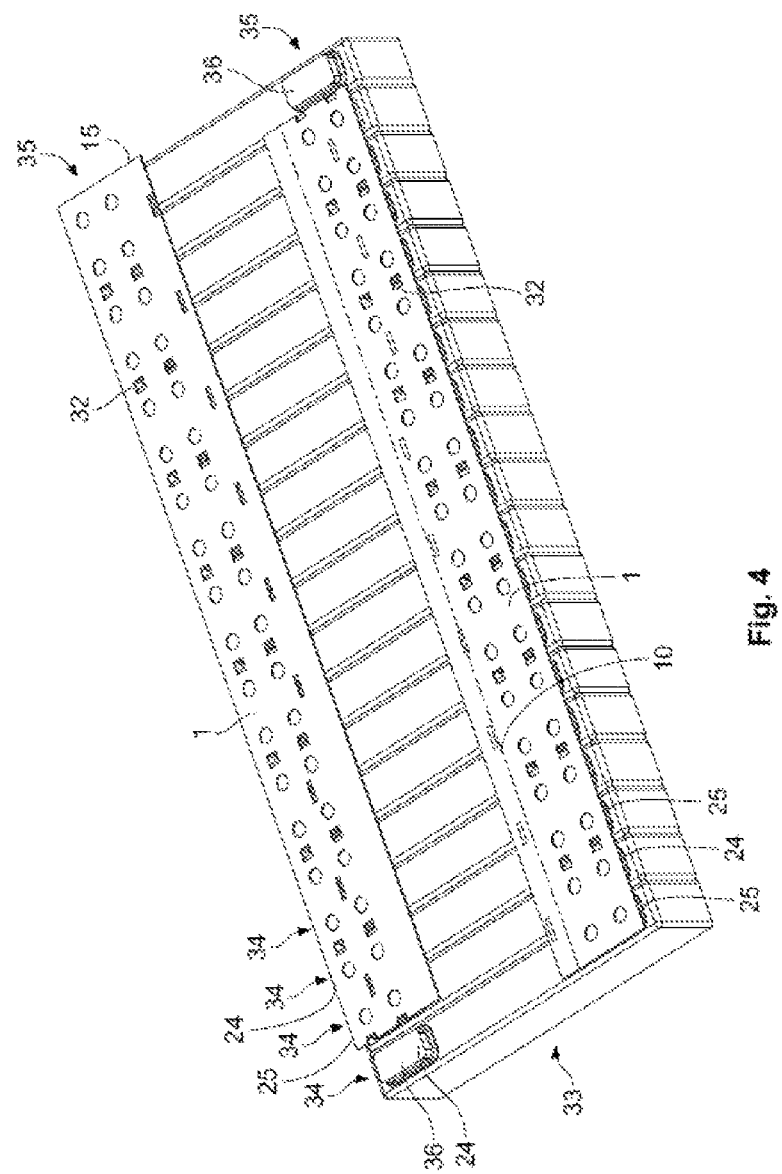

CONNECTOR FOR CONNECTING CELLULAR ELECTRICAL ELEMENTS

CROSS-REFERENCE TO RELATED APPLICATIONS

This application is a continuation of PCT International Application No. PCT/EP2014/072696, filed Oct. 23, 2014 which claims priority under 35 U.S.C. § 119 to German Patent Application No. 102013221872.9, filed Oct. 28, 2013.

FIELD OF THE INVENTION

The present invention relates to a connector, and more particularly, to a connector for connecting cellular electrical elements.

BACKGROUND

As is known in the prior art, voltage sources and/or sinks configured as galvanic cells, capacitors, or supercapacitors may be connected with one another in a traction battery of an electrical vehicle in order to reach high voltages and/or capacities. Voltage sources may simultaneously act as voltage sinks in order to repeatedly supply and remove electrical energy. Differently configured housings for the cells are used for each application in the prior art. This results in effort-intensive design and production, since the housings each must be designed individually and the appropriate tool components must be produced individually. Alternatively, individual cells are connected by manually arranging a conductive connecting part between them; however, this results in a highly complex production process.

SUMMARY

An object of the present invention, among others, is to provide a connector for connecting cellular electrical elements that is less complex and thus more cost-efficient. The disclosed connector has a ribbon-shaped support element, a ribbon-shaped retaining element, and a contact element arranged between the support element and the retaining element.

BRIEF DESCRIPTION OF THE DRAWINGS

The invention will now be described by way of example with reference to the accompanying figures, of which:

FIG. 4 is a schematic perspective view of the ribbon-shaped connector shown in FIG. 2 on a battery.

DETAILED DESCRIPTION OF THE EMBODIMENT(S)

The invention is explained in greater detail below with reference to embodiments of a ribbon-shaped connector for connecting cellular electrical elements. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
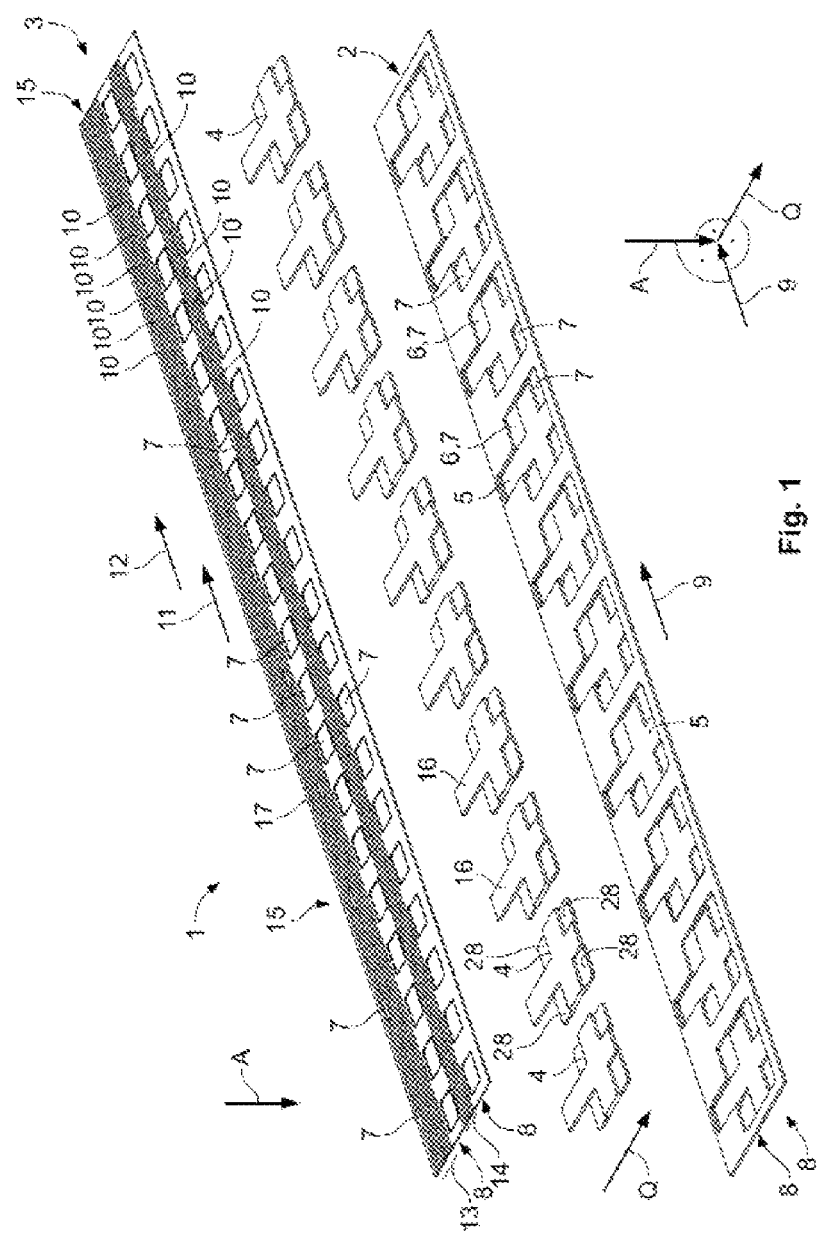
FIG. 1 is a schematic perspective view of a first embodiment of a ribbon-shaped connector according to the invention.

A ribbon-shaped connector 1 according to the invention is generally shown in FIG. 1. The ribbon-shaped connector 1 comprises a ribbon-shaped support element 2 and a ribbon-shaped retaining element 3. Between the support element 2 and the retaining element 3, several contact elements 4 are arranged. The major components of the invention will now be described in greater detail.

The ribbon-shaped support element 2 may be configured as an elongated plate, and as shown in FIG. 1, has receptacles 5 and openings 6.

The ribbon-shaped support element 2 may be formed by separating it from a longer ribbon material, for example, a ribbon material on a supply role or a flat flex cable, and then deep drawn, i.e., thermoplastically formed. However, as would be understood by one with ordinary skill in the art, the primary product for the support element 2 need not necessarily be from a supply roll. For example, parts may be separated from a plate- or board-shaped element, from which a support element 2 is moulded. It may also be produced by injection moulding. The support element 2 shown is configured as a plate in order to ensure good stability and simultaneously a certain degree of flexibility. If greater flexibility of the finished ribbon-shaped connector 1 is desired, the support element 2 may also be configured as a film.

The receptacles 5 may be moulded into the ribbon-shaped support element 2.

The openings 6 may be welded openings 7. The welded openings 7 may already be present on the ribbon material from which a part is cut, or be stamped or moulded in after separation, e.g., by deep drawing. The support element 2 has two rows 8 of welded openings 7. Within one row 8, the welded openings 7 are arranged regularly one after another along a longitudinal direction 9 of the support element 2. This allows several cellular electrical elements to be contacted in a row.

The support element 2 may consist of a thermoplastic material, for example, a thermoplastic polymer. Alternatively, the support element 2 may consist of another material, for example, a duroplastic or other insulating material.

The ribbon-shaped retaining element 3 may be configured as an elongated plate, and as shown in FIG. 1, has welded openings 7 and electrical conductors 10.

Like the support element 2, the retaining element 3 is ribbon-shaped. It may also be separated from a longer ribbon material. For example, it may be a separated part of a ribbon previously wrapped around a supply roll.

The ribbon-shaped retaining element 3 in FIG. 1 has two rows 8 of welded openings 7.

The electrical conductors 10 are embedded in the retaining element 3 and run along a longitudinal direction 11 of the retaining element 3 and a longitudinal direction 12 of the ribbon-shaped connector 1. The electrical conductors 10 run adjacent to one another, in particular parallel to one another. A first bundle 13 of electrical conductors 10 is arranged on an edge 15 of the retaining element 3, thus ensuring mechanical stability. A second bundle 14 of electrical conductors 10 runs between two rows 8 of welded openings 7 on the retaining element 3. In order to ensure the most compact possible configuration, the intermediate space between the rows 8 of welded openings contains the second bundle 14 of electrical conductors 10.

The retaining element 3 may consist of a thermoplastic material, for example, a thermoplastic polymer. Alternatively, the retaining element 3 may consist of another material, for example, a duroplastic or other insulating material.

The contact elements 4 are flake-shaped, as shown in FIG. 1, and each have a tongue 16 and a plurality of contact points 28. The contact elements 4 may consist of an electrically conductive material in order to allow for a good contact, and may be formed by stamping and/or embossing from a metal sheet.

The assembly of the ribbon-shaped connector 1 will now be described in greater detail.

The exploded view of FIG. 1 may also be interpreted as a pre-assembly position. During assembly, the contact elements 4 are inserted and partially form fit into the receptacles 5 of the support element 2. Then, the ribbon-shaped retaining element 3 is applied. The shape of the contact elements 4 allows them to be easily inserted between the two layers of the retaining element 3 and the support element 2. Simultaneously, this can allow for high current capability and load capacity. The connector 1 has a sandwich structure, whereby the contact elements 4 are arranged and retained between a layer formed by the retaining element 3 and a layer formed by the support element 2.

The retaining element 3 may be melted on the support element 2 by heating. This makes the retaining element 3 melt on more easily and softens it. It is form fit on and around the contact elements 4 and the support element 2, such that a partial form fit is obtained that remains when the retaining element 3 cools off and hardens. Simultaneously, an adhesive bond is created by the melting. The retaining element 3 consists of a hot-melting material that at least partially firmly bonds with the support element 2 and the contact elements 4. The retaining element 3 is thus glued to the support element 2 and the contact element 4. In an alternative configuration, the retaining element 3 may only be adhered to the support element 2. This may facilitate reuse of the contact elements 4, because there is no need for complicated cleaning after removal from the ribbon-shaped connector 1 if they are to be used in another ribbon-shaped connector 1.

The contact elements 4 are retained by the retaining element 3. Here, this occurs by connecting the support element 2 to the retaining element 3 and additionally by connecting the retaining element 3 with the contact element 4. When finished, the contact elements 4 are embedded between the support element 2 and the retaining element 3 and completely enclosed by them except for the openings 7. This provides good mechanical protection and simultaneously serves as insulation for the contact elements 4. The tongues 16 each extend between two adjacent welded openings 7 of a row 8 of welded openings 7 on the retaining element 3. This ensures a compact configuration in the longitudinal direction 12 of the connector 1. The tongues 16 thus extend perpendicularly to the longitudinal direction 12 of the electrical connector 1. The contact elements 4, when connected, at least partially protrude through the openings 7.

The contact elements 4 may be welded to corresponding cellular electrical elements through the openings 7. Depending on the application, it may also be unnecessary to weld the contact elements 4 to the cellular electrical elements. For example, pressing may suffice in order to obtain an adequate electrical contact.

Each of the welded openings 7 on the retaining element 3 is aligned with a welded opening 7 on the support element in the assembled ribbon-shaped connector 1. The welded openings 7 of the support element 2 and the retaining element 3 are thus aligned with one another on both sides of the contact elements 4. The welded openings 7 on the retaining element 3 serve to allow for welding with a welding device. Through the welded openings 7 on the retaining element 3, an electrode of the welding device may electrically contact the contact element 4 and simultaneously press the contact element 4 along a pressing direction A onto a corresponding element of the cellular electrical element (not shown) arranged under the support element 2. Then, current can be conducted through this connection, such that the contact element 4 is welded onto the electrical element. The alignment of the welded openings 7 on the retaining element 3 and the support element 2 can thus simplify the welding process.

By spacing the two rows 8 of the welded openings 7 on the retaining element 3, the contact elements 4 may be welded on two points spaced apart from one another in a transverse direction Q, thus making them more stable and less susceptible to nodding movements.

Each of the electrical conductors 10 is in electrical contact with a contact element 4. To this end, the retaining element 3 has additional welded openings 7 on the top and bottom on which the insulating material was removed, thus allowing the electrical conductors 10 to be welded to the contact elements 4. Each tongue 16 protrudes into a conductor area 17 of the retaining element 3. The tongue 16 leads to the first bundle 13 of conductors 10. Each of the conductors 10 of the first bundle 13 is connected with a tongue 16 of a contact element 4. This conductor 10 is insulated from the other contact elements 4 and their tongues 16 by the insulating material of the retaining element 3 because the electrical conductors 10 are embedded in the retaining element 3 and are only accessible in the area of the welded openings 7.

The electrical conductors 10 lead along the longitudinal direction 12 of the connector 1, and may be contacted, for example, in an area not shown here of other electrical elements in order to measure the voltage on the individual contact elements 4. Such a connection with another electrical element may be made on the end of the retaining element 3. In an alternative configuration, the retaining element 3 may also protrude beyond the support element 2, and an electrical contact may be made in the protruding part. For example, the electrical lines there may be exposed and/or open into a plug.

Figure 2:
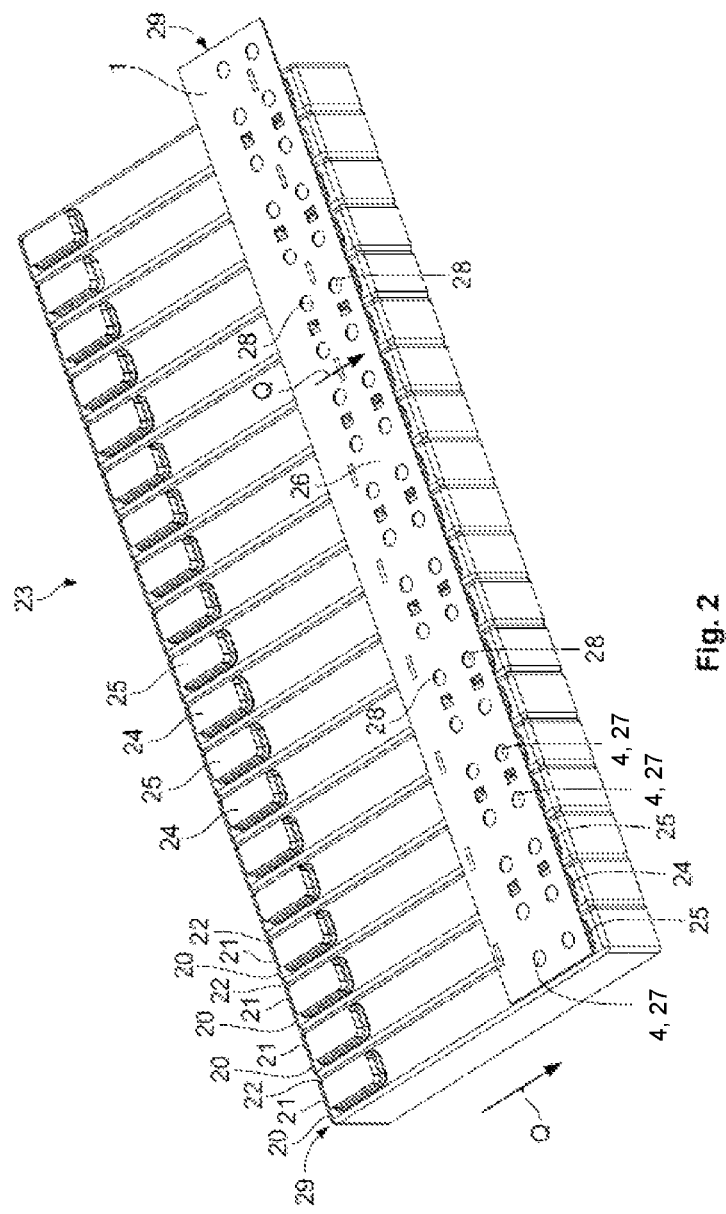
FIG. 2 is a schematic perspective view of a second embodiment of a ribbon-shaped connector according to the invention on a traction battery.

FIG. 2 shows a second embodiment of a ribbon-shaped connector 1 attached to several cellular electrical elements 20. The cellular electrical elements 20 are voltage sources and/or sinks 21 in the form of galvanic cells 22, which are part of a traction battery 23, as can be found, for example, in electrically powered vehicles for the recurrent withdrawal and storage of electrical energy. The cellular electrical elements 20 each have an anode 24 and a cathode 25. In the middle area 26 of the electrical connector 1, one contact element 4 each connects the anode 24 on a first galvanic cell 22 with a cathode 25 of a second galvanic cell 22. In the configuration shown here, the adjacent contact element 4 in the connector 1 then connects the anode 24 of a third galvanic cell 22 with the cathode 25 of a fourth galvanic cell 22, etc. Not shown here is another connector 1, which appropriately connects the electrodes on the opposite end in FIG. 2, thus displaced from the first connector 1 by one cell 22. Overall, thus, the cells 22 are serially connected with one another, such that the voltages of the galvanic cells 22 are added. The contact elements 4 thus act here as cell connectors 27 that connect the galvanic cells 22 with one another.

Two consecutive contact points 28 in a transverse direction Q each contact a single electrode of a galvanic cell 22. The following two contact points 28 in the longitudinal direction 12 of the electrical connector are arranged on the next galvanic cell 22, which is arranged here, too, on a single electrode. The contact elements 4 arranged on opposite ends 29 are only in contact with a single electrode of a galvanic cell 22. They protrude beyond the rest of the traction battery 23. They can be contacted on the two exposed contact points 28 and transmit the voltage to other electrical elements.

The electrical conductors 10 are each connected with one contact element 4, such that voltage present on this contact element 4 can be monitored on an ongoing basis.

Alternative to the configuration shown here, in which two connectors 1 are necessary in order to establish a continuous, zig-zagging current path, all anodes 24 and cathodes 25 of the cellular elements 20 may also be arranged in a straight line one after another in a single row. Then, a single connector 1 can suffice in order to establish a continuous current path. A first contact element connects an anode 24 of a first cellular element 20 with a cathode 25 of a second cellular element 20. The adjacent contact element 4 in the connector 1 then connects the anode 24 of the second cellular element 20 with the cathode 25 of a third cellular element 20, etc.

Figure 3:
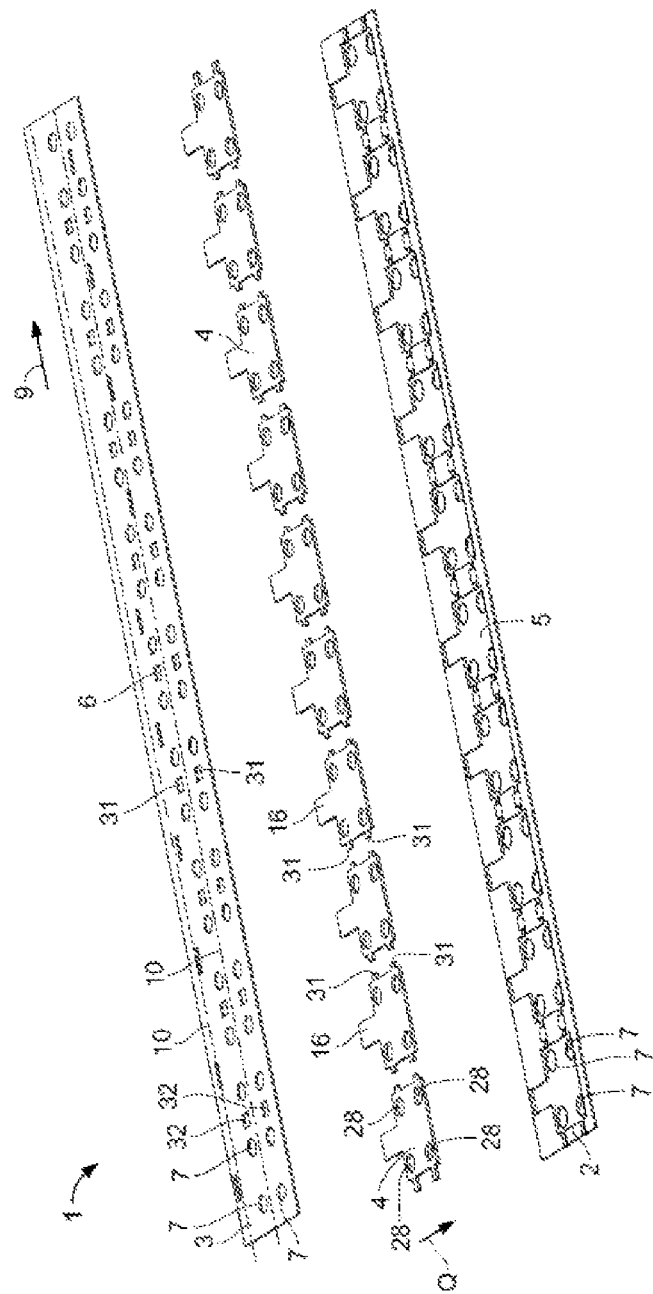
FIG. 3 is a schematic perspective view of the ribbon-shaped connector shown in FIG. 2.

FIG. 3 shows the second embodiment of a ribbon-shaped connector 1 in an exploded view. It consists of a ribbon-shaped support element 2, a ribbon-shaped retaining element 3, and several contact elements 4 arranged between the ribbon-shaped support element 2 and the ribbon-shaped retaining element 3. The ribbon-shaped support element 2 and the ribbon-shaped retaining element 3 are each separate parts of a previously longer ribbon, e.g., one wrapped around a supply roll.

In the ribbon-shaped retaining element 3, electrical conductors 10 are embedded, which are each connected with one contact element 4. The electrical conductors 10 are only indicated schematically here; only the electrical conductors 10 for two contact elements are shown in dotted lines.

The contact elements 4 of the second embodiment, as shown in FIG. 3, are flat, in particular even flatter than those of the embodiment of FIG. 1. The tongues 16 directly depart from a flat area and stick out from this flat area against the transverse direction Q. Also in this embodiment, the contact points 28 of the contact elements 4 are round, in particular circular. Such a configuration may be easier to produce than the configuration of FIG. 1. The contact elements 4 may be separate parts of a ribbon material that was embossed and/or stamped before or after separation, for example, in order to form the contact points 28.

The welded openings 7 on the ribbon-shaped support element and the ribbon-shaped retaining element 3 are accordingly also circular. The contact elements 4 also have retaining protrusions 31, which protrude from the contact elements 4 in and against the longitudinal direction 12 of the connector 1. The contact elements 4 may be mechanically retained during attachment to the voltage sources and/or sinks 21 via retaining openings 32 arranged on the retaining element 3. This makes it unnecessary, e.g., for the welding device to build up a mechanical pressure for fixation. The retaining and welding are separate in this configuration.

In FIG. 4, two ribbon-shaped connectors 1 according to the embodiment of FIG. 3 are shown arranged on a battery 33. The battery 33 consists of individual batteries 34, whereby the individual batteries each alternates in orientation, i.e., in the two rows 35 of electrodes, one anode 24 and one cathode 25 each are staggered. A first row 35 starts with an anode 24; a second row 35 starts with a cathode 25. The contact elements 4 shown covered here each connect an anode 24 of a first individual battery 34 with a cathode 25 of a second individual battery 34 or the cathode 25 of a first individual battery 34 with the anode 24 of a second individual battery 34. The two ribbon-shaped connectors 1 are displaced by one individual battery 34. In the configuration shown here, the voltage is thus not built up along a single ribbon-shaped connector 1. Rather, it is necessary for the two ribbon-shaped connectors 1 to be present, because the circuit does not run straight along a connector 1, but rather through the contact elements 4 and transversely between the two ribbon-shaped connectors 1. On the two terminal electrodes 36, the summed voltage is then tapped. In order to control the voltage on each contact element 4 individually, electrical connectors 10 are embedded in the ribbon-shaped retaining elements 3, which may be contacted individually on one end of the ribbon-shaped connector 1. In FIG. 4, a single electrical conductor 10 is indicated only schematically.

The drawings only show an exemplary use of the connector 1 on the galvanic cells 22, the connector 1 could also be used on other cellular electrical elements 20, for example, capacitors or supercapacitors.

Advantageously, the ribbon-shaped connector 1 shown with a ribbon-shaped support element 2 and a ribbon-shaped retaining element 3 is more cost-efficient to produce compared to injection-moulded connectors with housings, as used in the prior art. This is due in part to the fact that ribbon material is easier to produce, and that the assembly of the ribbon-shaped connector according to the invention is simpler. Furthermore, the ribbon-shaped connector 1 can be more flexibly used for various applications. Depending on how many electrical elements are to be contacted, the ribbon-shaped connector 1 may be produced in a desired length. Compared to the prior art, in which a separate housing must be designed and produced as an injection-moulded component for each desired length, it is sufficient with the ribbon-shaped connector 1 according to the invention to use a corresponding number of contact elements 4 and to cut the retaining element 3 and the support element 2 to the appropriate length. Such a method is much more cost-efficient than the previous method.

What is claimed is:

1. A connector for connecting cellular electrical elements, comprising:
    a ribbon-shaped support element having a plurality of receptacles and a plurality of welded openings extending through the ribbon-shaped support element;
    a ribbon-shaped retaining element having a plurality of welded openings extending through the ribbon-shaped retaining element; and
    a plurality of contact elements arranged between the ribbon-shaped support element and the ribbon-shaped retaining element, each of the contact elements is inserted and partially form fit into one of the receptacles, directly abuts both the ribbon-shaped support element and the ribbon-shaped retaining element, and is exposed to an area exterior of the connector through the welded openings of the ribbon-shaped support element and the welded openings of the ribbon-shaped retaining element, the contact elements are arranged along a longitudinal direction of the connector and all of the contact elements arranged between the ribbon-shaped support element and the ribbon-shaped retaining element have a same orientation with respect to both the ribbon-shaped support element and the ribbon-shaped retaining element, each of the contact elements has a tongue protruding in a direction perpendicular to the longitudinal direction, the tongue of each of the contact elements is disposed between a pair of adjacent welded openings of the plurality of welded openings of the ribbon-shaped retaining element in the longitudinal direction.

2. The connector of claim 1, wherein each of the contact elements is retained in the ribbon-shaped retaining element.

3. The connector of claim 2, wherein the ribbon-shaped retaining element is adhesively bonded to the ribbon-shaped support element.

4. The connector of claim 2, wherein an electrical conductor is embedded in the ribbon-shaped retaining element.

5. The connector of claim 4, wherein the ribbon-shaped retaining element has a plurality of electrical conductors.

6. The connector of claim 5, wherein the plurality of electrical conductors run parallel to one another.

7. The connector of claim 4, wherein the electrical conductor is connected to each of the contact elements.

8. The connector of claim 4, wherein each of the contact elements is flake-shaped.

9. The connector of claim 4, wherein the tongue contacts the electrical conductor.

10. The connector of claim 9, wherein the tongue extends in a direction perpendicular to the electrical conductor.

11. A cellular electrical element assembly, comprising:
a battery having a plurality of cellular electrical elements, each of the plurality of cellular electrical elements having an anode and a cathode; and
a ribbon-shaped connector attached to and forming an electrical connection between the plurality of cellular electrical elements, the ribbon-shaped connector having a ribbon-shaped support element having a plurality of welded openings extending through the ribbon-shaped support element, a ribbon-shaped retaining element having a plurality of welded openings extending through the ribbon-shaped retaining element, and a plurality of contact elements arranged between the ribbon-shaped support element and the ribbon-shaped retaining element, each contact element of the plurality of contact elements directly abuts both the ribbon-shaped support element and the ribbon-shaped retaining element, is exposed to an area exterior of the connector through the welded openings of the ribbon-shaped support element and the welded openings of the ribbon-shaped retaining element, and physically and electrically directly contacts the anode of a first cellular electrical element and the cathode of a second cellular electrical element through the welded openings of the ribbon-shaped support element, connecting the anode of the first cellular electrical element with the cathode of the second cellular electrical element, the contact elements are arranged along a longitudinal direction of the connector and all of the contact elements arranged between the ribbon-shaped support element and the ribbon-shaped retaining element have a same orientation with respect to both the ribbon-shaped support element and the ribbon-shaped retaining element, each of the contact elements has a tongue protruding in a direction perpendicular to the longitudinal direction, the tongue of each of the contact elements is disposed between a pair of adjacent welded openings of the plurality of welded openings of the ribbon-shaped retaining element in the longitudinal direction.

12. The cellular electrical element assembly of claim 11, wherein an electrical conductor is embedded in the ribbon-shaped retaining element.

13. The connector of claim 4, wherein the electrical conductor extends from a first end of the ribbon-shaped retaining element to an opposite second end of the ribbon-shaped retaining element in a longitudinal direction of the ribbon-shaped retaining element.

14. The connector of claim 1, wherein the welded openings of the ribbon-shaped support element are aligned and spaced apart in a transverse direction orthogonal to a longitudinal direction of the ribbon-shaped support element.

15. The connector of claim 5, wherein only the plurality of contact elements are arranged between the ribbon-shaped support element and the ribbon-shaped retaining element.

16. The connector of claim 1, wherein each of the contact elements has a plurality of contact points.

17. The connector of claim 16, wherein each of the plurality of contact points of each of the contact elements is exposed to the area exterior of the connector though a different one of the welded openings of the ribbon-shaped support element and a different one of the welded openings of the ribbon-shaped retaining element.

18. The connector of claim 16, wherein the ribbon-shaped support element has a pair of rows of welded openings each extending in the longitudinal direction and spaced apart from one another in a traverse direction orthogonal to the longitudinal direction.

19. The connector of claim 18, wherein each of the contact elements has a pair of contact points each exposed through a different one of the welded openings of a first row of the pair of rows of welded openings of the ribbon-shaped support element and another pair of contact points each exposed through a different one of the welded openings of a second row of the pair of rows of welded openings of the ribbon-shaped support element.

* * * * *